United States Patent [19]

Bergelt

[11] Patent Number: 4,893,779
[45] Date of Patent: Jan. 16, 1990

[54] MOUNTING DEVICE FOR POWER TRAIN ASSEMBLY OF A MOTOR VEHICLE

[75] Inventor: Dieter Bergelt, Rüsselsheim, Fed. Rep. of Germany

[73] Assignee: General Motors Corporation, Detroit, Mich.

[21] Appl. No.: 331,711

[22] Filed: Apr. 3, 1989

[30] Foreign Application Priority Data

Apr. 2, 1988 [DE] Fed. Rep. of Germany ....... 3811259

[51] Int. Cl.⁴ .............................................. F16M 3/00
[52] U.S. Cl. .................................. 248/638; 180/292; 248/913
[58] Field of Search ............... 248/638, 637, 657, 661, 248/913; 180/292, 298, 312

[56] References Cited

U.S. PATENT DOCUMENTS 3,849,857 11/1974 Murray Jr. ...................... 248/913 X
4,150,588 4/1979 Brewer ................................ 248/638

Primary Examiner—Ramon O. Ramirez
Attorney, Agent, or Firm—Ronald L. Phillips

[57] ABSTRACT

A mounting device for the power train assembly of a motor vehicle is rigidly attached to the assembly and is fastened by a damping member to the vehicle body. The mounting device has a housing, a retainer that can be displaced and immobilized therein, and a slider in the housing, perpendicular to the displacement of the retainer, that can be displaced and then immobilized by fastening to the damping member.

9 Claims, 3 Drawing Sheets

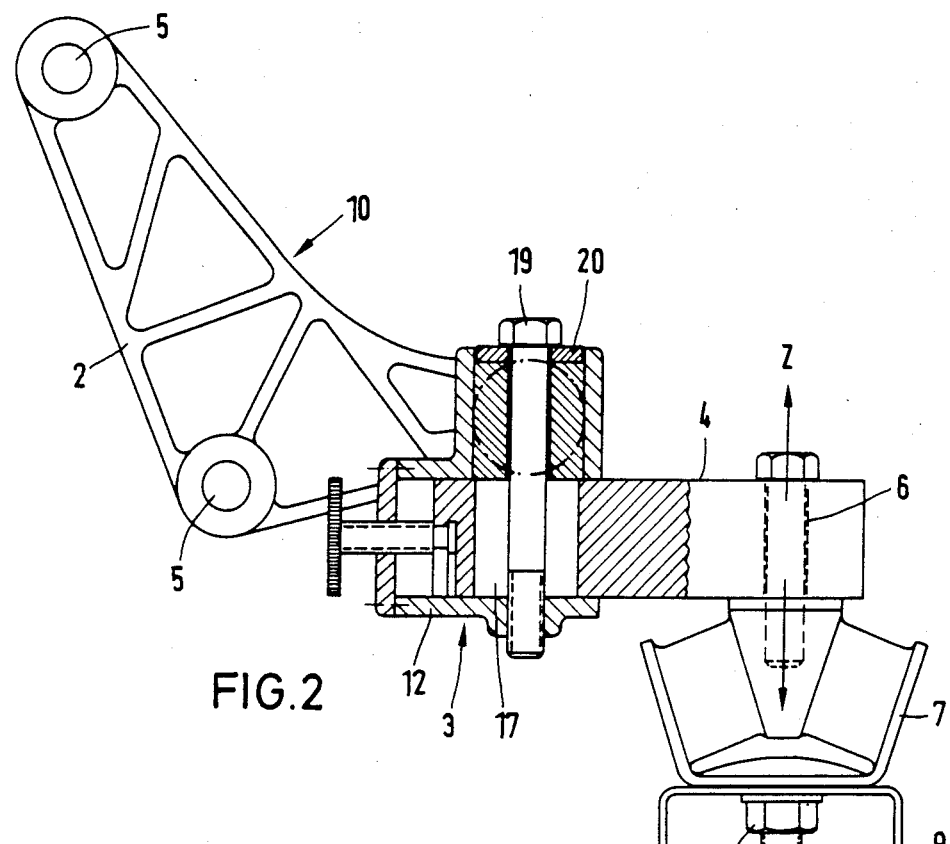
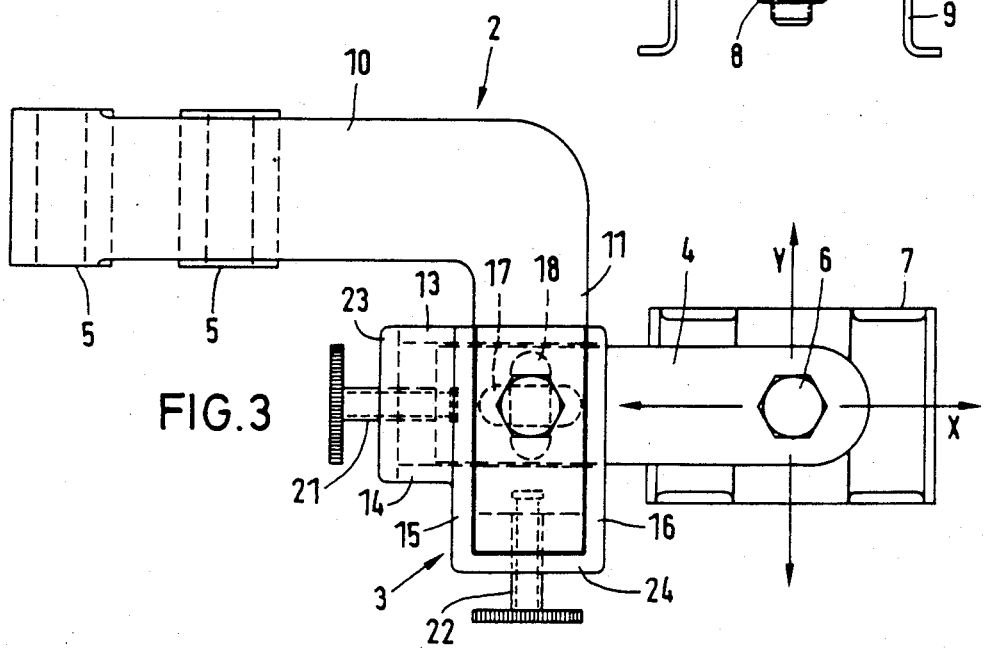

MOUNTING DEVICE FOR POWER TRAIN ASSEMBLY OF A MOTOR VEHICLE

TECHNICAL FIELD

The invention pertains to a mounting device for the power train assembly of a motor vehicle, especially the engine and transmission, that is rigidly connected to the assembly and can be fastened to the vehicle body by means of a damping member.

BACKGROUND OF THE INVENTION

Assemblies of a motor vehicle, especially the engine or transmission, are connected to the vehicle body or to the body frame by means of several mounting elements. Damping members placed between the mounting elements provide insulation, especially for noise and vibrations, between the engine and the body. The mounting elements are metal parts, typically sheet steel or cast aluminum.

In known mounts for motor vehicle assemblies, each mounting element has holes for attachment to the assembly and to the damping member, with the two attachment points on the mounting element having a permanent position. Large tolerances in the body are compensated for at this assembly joint by means of slots in the mounting element or damping member. Even with slots to compensate for tolerances, it is possible that the mount for the assembly is deformed when tightened. This means that the elastic part of the damping member is deformed and consequently does not possess its optimum noise insulation, not to mention the increased wear caused by the deformation. Lastly, the mounting elements for each additional assembly have different attachment dimensions, so that a variety of mounting elements must be prepared, even if the body dimensions vary only slightly from one another.

SUMMARY OF THE PRESENT INVENTION

The primary object of the present invention is to provide a deformation-free mount for an assembly of a motor vehicle such that the mount is usable even for different assemblies and/or body variances, and that there is additionally the possibility of optimizing the assembly position even after installation.

This is attained by means of a mounting device comprising a housing a retainer that can be displaced and immobilized, connected to the assembly, and a slider in the housing, that can be displaced and immobilized perpendicular to the displacement direction of the retainer and be connected to the damping member.

With the displaceable mounting device according to the present invention, the position of the assembly attachment can be optimized after the assembly has been installed, meaning that the assembly can be aligned with respect to the corresponding damping member without deformation, resulting in high noise insulation with minimal stress on the damping member.

As a rule, it is sufficient for the assembly to be capable of being displaced with respect to the damping member in two directions. This circumstance is taken into account by the configuration of the housing of the mounting device which, on the one hand, accommodates the retainer so that it can be displaced in one direction, and on the other hand, by the slider which can be displaced perpendicular to the displacement direction of the retainer. The retainer and slider can essentially be displaced in a horizontal plane, but in addition, in a corresponding configuration of the housing and of the mounting of retainer and slider in the housing, there exists the possibility of providing for displacement in a direction perpendicular thereto.

Motor vehicle assemblies are typically mounted by means of several mounting elements, for example, the engine, generally by means of three mounting elements. For the purposes of the present invention, all three mounting devices do not necessarily need to be configured so as to be displaceable as will become more readily apparent later.

Advantageously, the retainer can be displaced in the longitudinal axis of the assembly and the slider in the transverse axis of the assembly. The housing preferably accommodates the retainer and slider superimposed on one another, and clamping means are provided to secure the retainer and the slider. The retainer and slider are secured in an especially simple manner by a common clamping arrangement acting upon the latter by means of a common pressure plate.

An immobilized adjustment of the mounting device is effected in an especially simple manner by the retainer and slider having mating holes facing one another, such that at least one pin can be inserted into holes aligned with one another. In the inserted position, the pin holds the retainer and slider in the position aligned with one another. To enable even more precise mounting of the assembly in the body, one advantageous embodiment of the invention provides for the retainer and/or slider each to be adjustable by means of an adjusting screw in the housing.

The retainer and the slider can be configured differently. One embodiment provides for the portions of the retainer and slider which come into engagement with the housing to be cubical in shape, and for the housing to have correspondingly shaped recesses located at right angles to one another. There is also the possibility for the retainer and slider to have trapezoidal cross sections and to be guided in recesses in the housing with corresponding cross sections. The retainer and/or the slider themselves can be straight, or depending on the location of the assembly with respect to the body, the shape of the retainer can also be angled.

Additional features of the invention are presented in the description of the figures.

DETAILED DESCRIPTION OF THE DRAWINGS

In the figures, the invention is illustrated by means of several exemplary embodiments, without being limited thereto.

Figure 1:
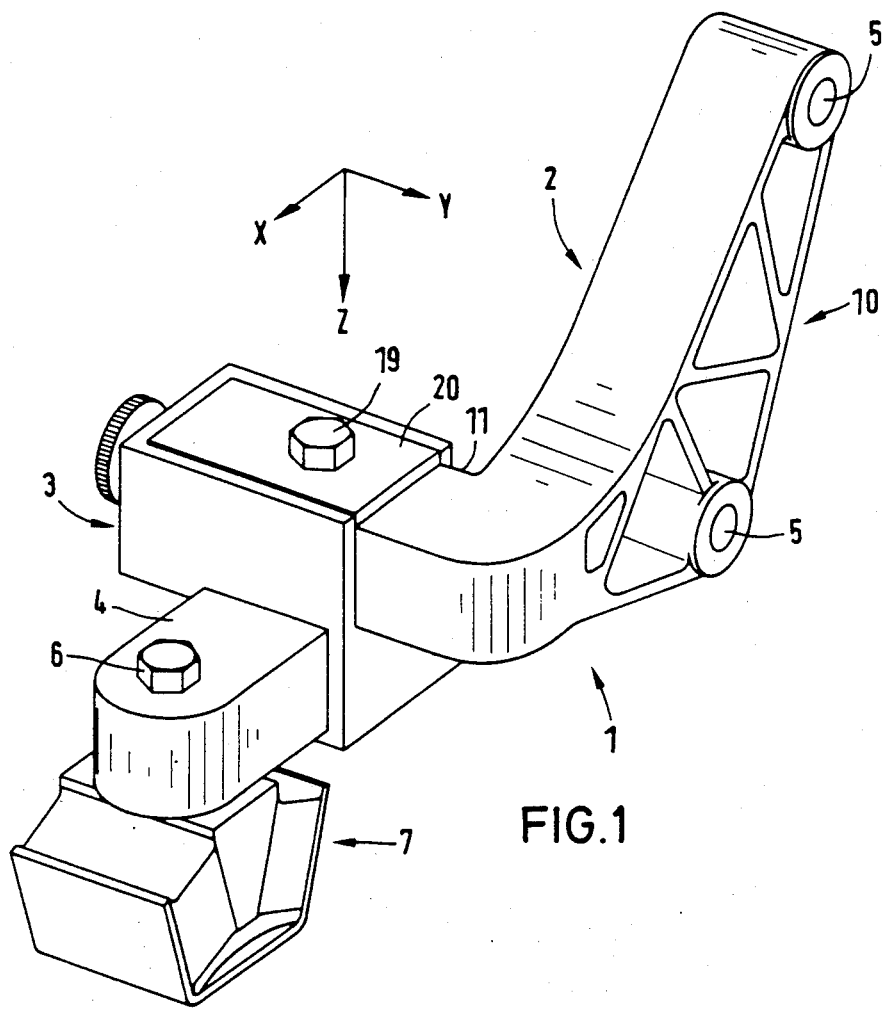
Figure 4:
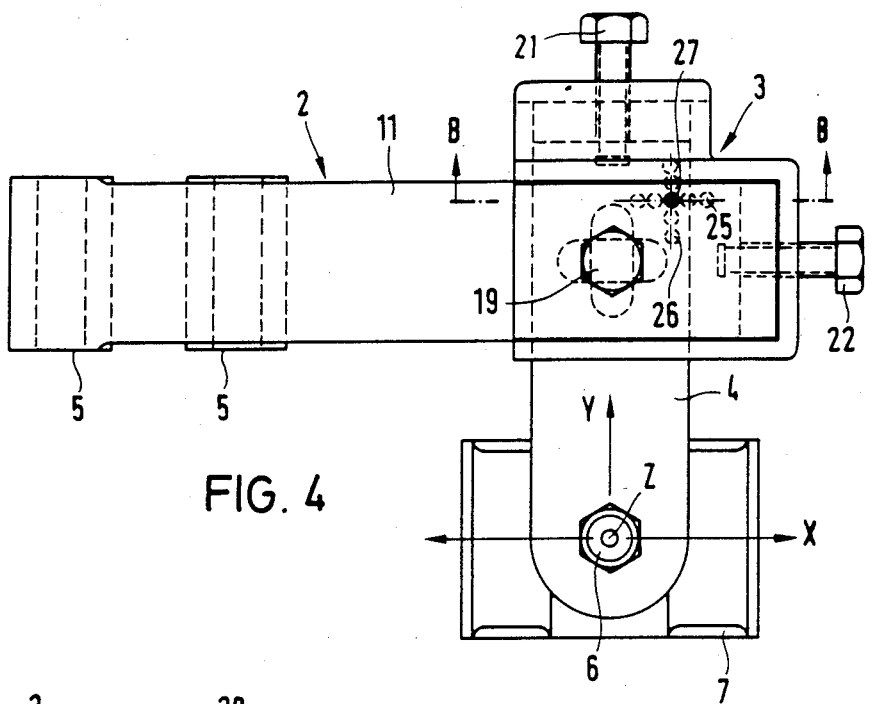
Figure 5:
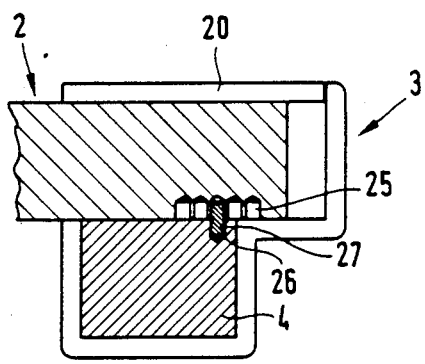
Figure 6:
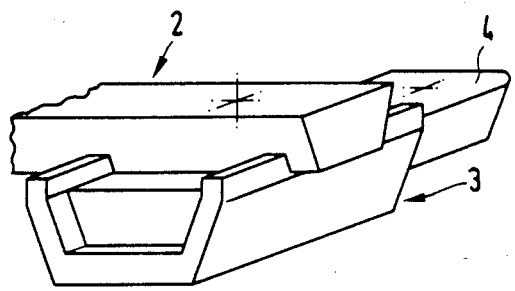

FIG. 1 is a three-dimensional representation of the mounting element according to the invention, connected to a damping member, in a first embodiment, FIG. 2 is a cross section through the housing of the mounting element along the X-Z plane in FIG. 1, FIG. 3 is a top view of the mounting element and the damping member, seen in the direction of the arrow Z in FIG. 1, FIG. 4 is a top view of the mounting element and damping member according to a second embodiment of the invention, in similar to FIG. 3, FIG. 5 is a cross section through the mounting element along B—B in FIG. 4, and FIG. 6 is a configuration of the retainer and slider modified as compared to the embodiments according to FIGS. 1 to 5.

FIGS. 1 to 3 show, with reference to the first embodiment of the invention, the mounting device 1, which essentially consists of the retainer 2, the housing 3 and the slider 4. In the region of the two holes 5, the retainer 2 is bolted to a part of the power train assembly of the motor vehicle (not shown), for example, to the engine or transmission, and the slider 4 is attached by means of a bolt connection 6 to the damping member, configured as a damping block 7, which in turn is secured by a bolt connection 8 to the body 9.

The retainer 2 is configured as a casting and consists of a ribbed portion 10 accommodating the holes 5, and a retainer extension 11, oriented perpendicular thereto in the Y axis and having a rectangular cross section, which passes through a correspondingly oriented and shaped recess in the housing 3. The slider 4, also rectangular in cross section, passes through an additional recess in the housing 3, oriented in the X axis.

The housing has at the bottom—as oriented in the figures—the recess for the slider 4 and above it in the right-hand corner the recess for the retainer extension 11, with the slider 4 resting upon the floor 12 of the housing 3 and being guided through its side walls 13 and 14, while the retainer extension 11 is guided through the side walls 15 and 16, running perpendicular to the side walls 13 and 14, and rests upon the slider 4 where it crosses the latter. Passing through each part is a slot 17 and 18, extending in the X axis in the slider 4 and in the Y axis in the retainer extension 11. The two slots 17 and 18 accommodate an immobilizing bolt 19, which can be screwed into the floor 12 of the housing 3, and in the bolted-down state, secures the retainer extension 11 and the slider 4 to one another by means of a pressure plate 20 laid on the retainer extension 11. Lastly, the housing 3 is also equipped with two adjustment screws 21 and 22, which pass through threaded holes in the respective end walls 23 and 24 of the housing 3 and are positively connected to the slider 4 and retainer extension 11.

When the engine is installed, the immobilizing bolt 19 is at first tightened only slightly, so that the slider 4 and retainer 2 can be displaced in the housing 3 with respect to one another. The retainer 2 is then attached to the engine, and the slider 6, by means of the damping block 7, to the body 9, fine adjustment of the retainer 2 and slider 4 in the X and Y axes is performed by means of the two adjustment screws 21 and 22, respectively; then lastly, with the engine and body aligned in position with one another, the immobilizing bolt 19 is tightened, and the engine is thus secured with respect to the body. The maximum adjustability of the mounting element is determined by the size of the slots; if the mounting element is to be used at another point on the engine or transmission, where the position in the Z axis must be changed, this can easily be done by inserting a new slider, which must then be adapted to the attachment on the damping block. As a result of its variable utilization at several points on the vehicle, the mounting element according to the invention thus leads to a considerable reduction in the number of parts, along with optimum mounting conditions for the assembly.

In the embodiment shown in FIGS. 4 and 6, parts corresponding in function to the embodiment in FIGS. 1 to 3 are labeled, for the sake of simplicity, with the same reference numbers. The embodiment is largely identical to the one according to FIGS. 1 to 3, with the difference that both the retainer 2 and the slider 4 are straight, and a special connection between these two parts is provided. For example, the retainer 2 is equipped with five holes 5 on its side facing the slider 4, and the slider 4 has, on its side facing the retainer 2, five corresponding mating holes 26. The holes 25 and 26 are in each case arranged behind one another in the longitudinal axis of the retainer 2 and slider 4, so that when the retainer 2 and slider 4 are assembled, the rows of holes on the parts run perpendicular to one another. To join the retainer 2 and slider 4, a pin 27 is inserted, corresponding to the offset between parts 2 and 4, into the hole 26 in the slider 4 which corresponds to the row of holes in retainer 2, and when the assembly is installed, the retainer 2 is aligned longitudinally with the slider 4, and in the position in alignment with the hole 25 that aligns with the hole 26 holding the pin 27, is placed over the projecting end of the pin 27. The retainer 2 and slider 4 are then again secured in a known manner by means of the pressure plate 20 and the immobilizing bolt (not shown in detail in FIG. 5).

Lastly, FIG. 6 shows a configuration of the retainer 2 and slider 4 that is modified compared to the embodiment according to FIGS. 1 to 5. In this instance, both the retainer 2 and slider 4 have a trapezoidal cross section, and these parts are guided in recesses in the housing 3 having the corresponding cross section; details of the connection are not elucidated in the representation in FIG. 6.

The foregoing description of the preferred embodiments of the invention have been presented for purposes of illustration and description. They are not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various other embodiments and with various modifications as is suited to the particular use contemplated. All such modifications and variations are within the scope of the invention as determined by the appended claims when interpreted in accordance with breadth to which they are fairly, legally and equitably entitled.

I claim:

1. Mounting device attaching for a power train assembly of a motor vehicle to a vehicle body by a damping member, characterized in that the mounting device comprises a housing, a bracket slideable and fixable in said housing and connected to the assembly, and a sliding block slideable and fixable in the housing perpendicularly to the direction of sliding of the bracket and connected to the damping member.

2. Mounting device according to claim 1, characterized in that the bracket is slideable in the longitudinal direction of the assembly, and the sliding block is slideable in the transverse direction of the assembly.

3. Mounting device according to claim 1 characterized in that the housing contains the bracket and the sliding block one above the other, and clamping means are provided for fixing bracket and sliding block.

4. Mounting device according to claim 3, characterized in that the bracket and the sliding block are fixed by common clamping means acting through a pressure plate.

5. Mounting device according to claim 4, characterized in that the bracket and the sliding block have mating bores facing towards each other, wherein at least one pin can be inserted in said bores aligned with each other.

6. Mounting element according to claim 4, characterized in that the bracket and the sliding block are adjustable in the housing in each case by a set screw.

7. Mounting device according to claim 6, characterized in that the regions of the bracket and sliding block which become engaged with the housing are cuboid, and the housing comprises correspondingly designed recesses arranged at right angles to each other.

8. Mounting device according to claim 6, characterized in that the bracket and the sliding block are of trapezoidal cross section and are guided in recesses of corresponding cross section in the housing.

9. Mounting device according to claim 8, characterized in that the bracket and the sliding block are straight.

* * * * *